No. 622,148. Patented Mar. 28, 1899.
E. F. HODGSON.
CHICKEN BROODER.
(Application filed Jan. 7, 1899.)

(No Model.)

WITNESSES:
Edw. Thorpe

INVENTOR
Ernest F. Hodgson.
BY
ATTORNEYS.

THE NORRIS PETERS CO., PHOTO-LITHO., WASHINGTON, D. C.

UNITED STATES PATENT OFFICE.

ERNEST FRANKLIN HODGSON, OF DOVER, MASSACHUSETTS.

CHICKEN-BROODER.

SPECIFICATION forming part of Letters Patent No. 622,148, dated March 28, 1899.

Application filed January 7, 1899. Serial No. 701,509. (No model.)

*To all whom it may concern:*

Be it known that I, ERNEST FRANKLIN HODGSON, of Dover, in the county of Norfolk and State of Massachusetts, have invented a new and Improved Chicken-Brooder, of which the following is a full, clear, and exact description.

The object of the invention is to so improve upon the construction of the brooder for which Letters Patent were granted to me July 28, 1896, No. 564,689, and, in fact, upon other brooders of like type, as to render such brooders much more efficient, economic, and more readily controlled.

The especial object of the invention is to provide a means whereby the floor of the brooding-chamber will not become unduly heated, and whereby the heat may be evenly distributed at the upper portion of the hover-chamber, and whereby the heat passing into the said hover-chamber will be under complete control.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
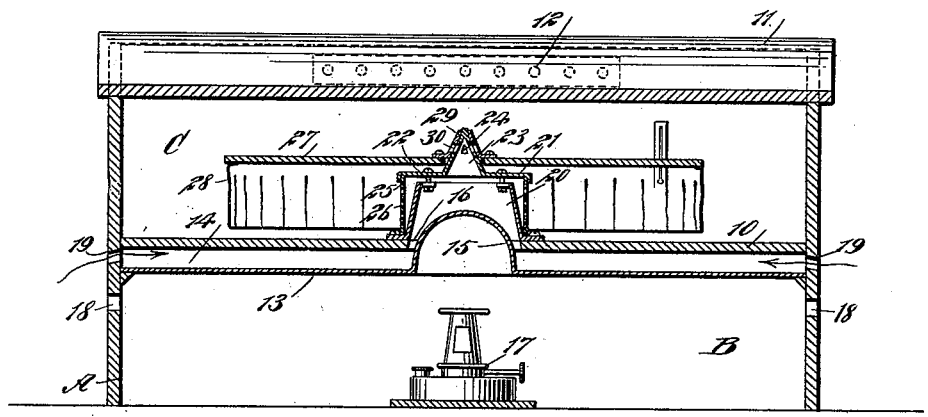
Figure 2:
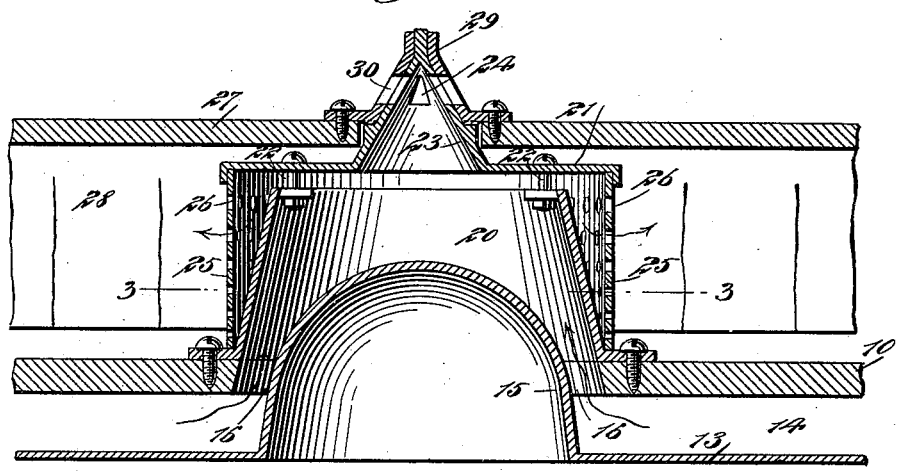
Figure 3:
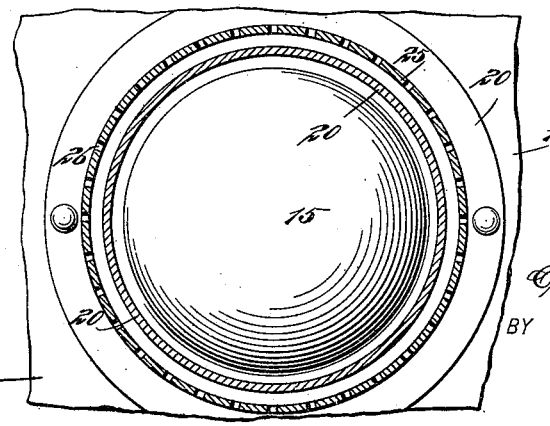

Figure 1 is a longitudinal vertical section through the complete brooder. Fig. 2 is a longitudinal section drawn on an enlarged scale, the section being taken through a portion of the hover-chamber, the floor of the brooder, and the dome of the heating-chamber, together with the support for the latter; and Fig. 3 is a horizontal section taken substantially on the line 3 3 of Fig. 2.

A represents a casing, box, or housing which may be made of wood or other suitable material, the said casing or housing being provided with a horizontal partition 10, that separates it into a lower heating or lamp chamber B and an upper brooding-chamber C. The cover or roof 11 of the box or casing A may be given any desired shape, and openings 12 are made in one side of the box or casing near the roof for the outward passage of air. The said box or casing may be provided with one or more windows, if desired.

A plate 13 is horizontally supported in the heating or lamp chamber B at such distance below the partition 10 as to provide a space 14, the partition 10 being virtually the bottom or floor of the brooding-chamber C. The plate 13 at its center is provided with an upwardly-projecting dome 15, the said dome being made to pass through a central opening 16 in the floor 10 of the brooding-chamber.

A lamp 17 or other source of heat-supply is located in the heating-chamber B immediately below the heating-dome 15, as is shown particularly in Fig. 1. Vents 18, arranged to supply air to the heating-chamber, are produced in the box or casing, and vents 19 are also made in the box or casing, communicating with the space 14 between the plate 13 and floor of the brooding-chamber, the said vents being adapted to supply cold air to the exterior of the heating-dome 15, said air becoming heated before entering the brooding-chamber.

A dome 20 is secured upon the upper face of the floor 10 of the brooding-chamber, adjacent to the margin of the opening 16, and the upper end of the dome 20 is open; but said open end of the dome 20, which may be termed a "hover-dome," is closed by a plate 21, supported a slight distance above the upper end of the hover-dome by screws or bolts 22, attached to said dome, and, further, through the medium of a casing 25, that extends around the hover-dome, engaging with the bottom flange thereof, the casing being provided with apertures 26.

A conical hollow projection 23 is carried upward from the central portion of the cover-plate 21 of the hover-dome, and this conical projection 23 is provided near its apex with openings 24. The conical projection 23 of the cover-plate 21 is adapted as a support upon which a hover-board 27 may turn, the said board being provided with a downwardly-extending marginal apron 28, thus forming a hover-chamber. The apertured casing 25 serves to prevent the chicks from coming in contact with the highly-heated hover-dome 20, yet the air heated by the heating-dome 15 and hover-dome may readily pass out into the hover-chamber through the openings in the said casing 25.

The hover-board 27 is supported through the medium of a conical cap 29, fitted to turn upon the exterior of the conical projection 23, as is best shown in Fig. 2, and the conical cap 29 is provided with openings 30, adapted to register with the openings in the conical projection 23, so that the heated air may be permitted to escape in greater or less quantities above the hover-board or may be directed entirely into the hover-chamber.

When the surface above the lamp is straight, as in the ordinary construction of brooders, the heat from the lamp is deflected back and downward upon the lamp, thus overheating it, which action is not possible when the dome 15 is employed. Furthermore, when a flat surface is placed above the lamp and beneath the floor of the brooding-chamber the heat is spread to an undesirable extent under the said floor, producing a surplus of bottom heat, which is a serious objection, whereas under the construction of dome shown the greatest amount of heat is at the top portion of the upper dome or between the hover-dome and the floor-level and more heat is obtained at a desirable point in the brooder than under the ordinary construction.

The general arrangement or heating system of the improved brooder is as follows: Cold air is drawn in from the outside through the vents 19 and is drawn toward the heating-chamber 15 through the space 14. The heated air passes up through the opening 16 in the floor of the brooding-chamber to the top of the brooder-dome, where the air escapes into the space between the brooder-dome and casing and out through the openings in the casing, being equally distributed around the upper portion of the brooder-chamber. When the register at the top of the hover-chamber is open, some of the heat escapes through the same, as stated, thus cooling the lower portion of the hover-chamber. Under this arrangement a constant current of pure warm air is obtained under the hover-board, where the chicks are located. A thermometer (not shown) is provided to register the degree of heat under the hover-board.

The object in making the cover-plate 21 solid instead of perforated is to insure cleanliness and ventilation, since in the rearing of chickens the hover-board is sometimes removed, and if the plate 21 were perforated dirt would probably sift in between the metal plate and the floor of the brooder-chamber and clog up such space, thus preventing a proper supply of cold air.

Having thus described my invention, I claim as new and desire to secure by Letters Patent—

1. In a chicken-brooder, the combination, with a ceiling-plate provided with a dome, and a heating apparatus located below the dome, a brooding-chamber into which the heating-dome extends, and means for supplying air to the brooding-chamber where the heating-dome enters the same, of a second dome located above the heating-dome, and a hover-chamber consisting of a hover-board provided with pendent sides, and means for mounting the said board above the upper dome, heat being supplied to the hover-chamber from the said upper or hover dome, as described.

2. In a chicken-brooder, the combination, with a heating and a brooding chamber, the heating-chamber being provided with a ceiling-plate and the ceiling-plate with a heating-dome extending up through the bottom of the brooding-chamber, and means for supplying heat to the heating-dome and atmospheric air to the exterior of the heating-dome and the brooding-chamber, of a second dome located above the heating-dome, the second or upper dome having an open top, an apertured casing extending around the upper dome, a cover-plate supported by said apertured casing, a hover-board mounted upon the said cover-plate, the hover-board being provided with a marginal pendent section, and a ventilator forming a portion of the said cover-plate, as described.

3. In a chicken-brooder, the combination, with a heating-chamber, a brooding-chamber above the heating-chamber, a ceiling-plate located within the heating-chamber, the ceiling-plate being provided with a dome that extends through the bottom of the brooding-chamber, and means for heating the said dome, of a second dome located above the heating-dome, and within the brooding-chamber, the upper or second dome having an open top, an apertured casing surrounding the said upper dome, a cover-plate for the upper dome, supported by the apertured casing, the cover-plate being provided with a conical apertured projection, and a hover-board, provided with an apertured support, fitted to turn upon the conical projection of the cover-plate, the said hover-board being provided with a marginal pendent portion, as and for the purpose specified.

ERNEST FRANKLIN HODGSON.

Witnesses:
I. R. STOWELL,
THOMAS HODGSON.